Nov. 25, 1941.  A. WENDLER  2,263,601
METHOD FOR ENCASING OR COATING WIRES, RODS, OR TUBES WITH GLASS
OR OTHER THERMOPLASTIC SUBSTANCES
Filed Aug. 30, 1938

Inventor:
ALFRED WENDLER

By  Ferd. Much
Attorney.

Patented Nov. 25, 1941

2,263,601

UNITED STATES PATENT OFFICE 2,263,601

METHOD FOR ENCASING OR COATING WIRES, RODS, OR TUBES WITH GLASS OR OTHER THERMOPLASTIC SUBSTANCES

Alfred Wendler, Berlin-Dahlem, Germany

Application August 30, 1938, Serial No. 227,531
In Germany September 3, 1937

8 Claims. (Cl. 49—81)

Figure 1:
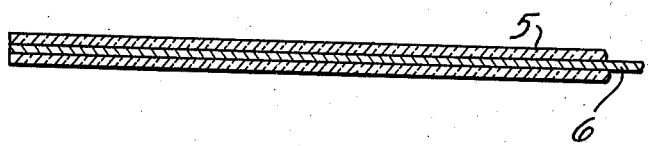
Figure 2:
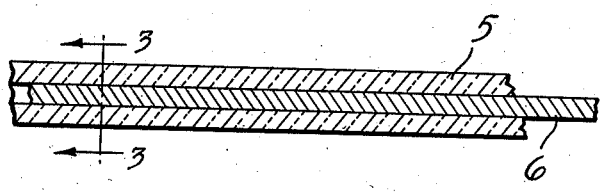
Figure 3:
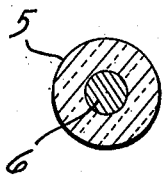

This invention relates to a method for encasing or coating wires, rods or tubes, in fact all cylindrical or prismatic elongated bodies, with glass or with other thermoplastic substances, this method presenting several advantages over the known methods for the same purpose. In the accompanying drawing which shows the article produced by the method:

Fig. 1 is a fragmentary longitudinal sectional view illustrating the wire, rod, tube or the like encased in a coating of glass or other thermoplastic substance, Fig. 2 is an enlarged fragmentary longitudinal sectional view, and Fig. 3 is a cross-sectional view taken on line 3—3 of Fig. 2. The invention is carried out, using for example a glass tube 5 and a metal wire 6, in such a manner that the metal wire is accommodated in the interior of the glass tube, any point of the glass tube is softened by heating and the glass tube is drawn so quickly, by pulling the wire at the same time with one end of the glass tube, that the thinner glass wall or film formed by the drawing permanently bears against the wire drawn through the heated point of the tube. The quicker one pulls or the higher the glass temperature is during the drawing, the thinner will be the drawn glass wall or film. By alteration of these two circumstances it can be made practically of any desired thickness. It is possible, when drawing the glass tube, to pull both ends thereof away from the flame or heated intermediate point of the glass tube. As a rule, however, it is advisable to proceed as in glass spinning, that is to firmly hold the glass tube in such a position that the tip or the point of the tube to be drawn remains continually exposed to the flame and to draw from this tip or point the glass tube with the wire in it.

If the ratio of the cross-section of the wire or the like to the thickness of the resultant glass film exceeds a certain limit, there is a danger of the glass film cooling too rapidly when coming into contact with the enclosed wire and of becoming brittle, so that it breaks and tears off. In this case it is advisable to provide for a previous heating of the wire length moving towards the drawing point.

A glass tube formed directly from the molten mass and still in plastic state may be used for the drawing, instead of a ready glass tube. The production of such a plastic glass tube is known from the mechanical process and machines for drawing glass tubes.

The wires or the like to be coated may be of any material capable to withstand the temperature at which the glass tube can be drawn. Chiefly metals come into question but also rods or tubes of glass can be coated with glass according to the invention. It is also possible to apply the method to such materials which do not withstand the drawing temperature of the glass used. If the drawing takes place very quickly, the rod, wire or the like passes so quickly through the heated point of the glass tube and the glass film bearing against it is so thin and contains such a small quantity of heat that any marked change in the material of the wire or the like does not occur although the material in question would not permanently withstand the drawing temperature of the glass. In this instance it is advisable to select the diameter of the glass tube relatively to that of the wire or rod larger than would otherwise be necessary. Thus, the heated wall of the glass tube remains farther away from the wire or the like drawn therethrough and the drawn out glass film has more time to cool down before it comes to bear against the wire or rod.

In this instance and in general it is advisable, but not absolutely essential, to allow a mechanical resistance to act on the wire in the opposite direction to that of the pull when drawing, so that the wire remains continually stretched during the drawing operation and remains as accurately as possible in the axis of the glass tube without contacting with the glass wall at irregular intervals.

Whether the glass film only contacts with the encased body or melts on this body depends upon the circumstances that is upon the nature of the encased body and upon the heating of the body or wire drawn through during the drawing operation and upon the temperature of the drawn out glass film at the moment of contacting. As, however, it is desirable that the glass coated articles produced according to this method are of uniform condition, that is form throughout only an encasing sheath of glass or a coating melted on them throughout, provisions are made, in the event that the one or other result cannot be reliably expected, for preventing or favouring the melting on of the glass. There are several means available for this purpose which are known per se from the glass industry. To prevent adhering, a very fine jet of air or of some other gas may be blown through during the drawing process between the glass and the article to be encased, or before the drawing operation the article may be coated with a solid or liquid substance which evaporates at the drawing temperature. On the other hand, to assist the melting on, the article to be coated may be covered with a flux (borax, alkalis) or it may be previously heated, or the article already coated with glass is again heated to a temperature suitable to cause adhesion either directly after being coated or in a subsequent operation. If the expansion under heat of the coated material does not differ considerably from the encasing glass, there is no reason why the fusion of the casing and the core should not be assisted. This applies particularly to metal cores which may be made of certain alloys (for example nickel iron) with an expansion coefficient similar or equivalent to that of glass. However in the case of large differences in expansion coefficients, the loose coating is recommended.

The method can be used for very many purposes in different branches of industry, in that all characteristic properties of the glass can be utilized separately or in combination when encasing or coating with glass, that is for example resistance against chemical influences, whether acids, water or air, bad heat and electricity conductivity, transparency for light and heat rays, hardness. The resistance of the casing against chemical influences is important especially for encasing or coating metal wires or the like, also the bad heat and electricity conducting properties. The transparency for light and heat rays in combination with the chemical resistance or bad conductivity may be utilized in the encasing or coating of radiating wires, rods or the like; preferably in using glasses with a high melting point or proof against sudden cooling.

A particularly important application of the method is the encasing or coating of electric wires, in which case the glass constitutes a substitute for imported or expensive insulating materials.

There is a certain restriction in the possibilities of use for electric wires owing to the fact that the glass is not very flexible, that is would break when the coated cable is subjected to relatively slight bending. Therefore it is generally not possible, to bend at ordinary temperatures wires insulated according to the present method. Nevertheless wires can be made with curved sections by interposing between the straight lengths curves of flexible insulated wire or by heating the glass insulated wire until the glass becomes plastic and then bending as required. Coils of wires insulated according to the present method may be made by winding on suitable cores the wires immediately after they have been encased in glass and while the glass is still pliable. Machines which enable the winding of glass tubes to form helical glass coils have been developed by the glass refining industry in connection with the manufacture of glass bracelets. However, it is evident that straight lengths could easily be subsequently reheated and wound on to a suitable core.

The present method presents considerable advantages over the known methods for encasing or coating with glass. It is much simpler and more effective than for example enamelling. In the form, in which the drawn glass wall or glass film loosely bears against the encased body, it offers the advantage over coatings which can be obtained by fusing on unshaped glass or glass forming mixtures, that the difference of the heat expansion coefficients of glass and of the encased body, for example the metal core or rod, is no obstacle, whereas a fused on coating would crack or chip off. In the form in which the glass film is fused on, it possesses over the fusing on of unshaped glass masses or glass-forming mixtures the advantages of great cheapness and efficiency and perfect smoothness of the coating obtained. In the first form, loose encasing, one has a much freer choice of the kind of glass than in the case of enamelling, where only easily fusible glasses or mixtures can be used.

It is obvious to coat with glass, wires and the like, especially electric conductors, by pushing them into finished glass tubes. As compared herewith the present method possesses the advantage, that the glass casing can be made with a much thinner wall than a glass tube first made separately and then to be slipped on should be allowed to have if it is not to break in the slipping on process. Furthermore the casings produced according to the invention, even if they are not subsequently fused on, lie much closer on the wire or the like than could be attained by slipping on a glass tube. Therefore they afford better protection for the enclosed wire or the like and can be more easily fused on subsequently.

I claim:

1. A method for encasing wires, rods and tubes with thermoplastic material such as glass, consisting in placing in a glass tube the article to be encased, heating to plastic heat any point of said glass tube, pulling the wire through the heated point, drawing at the same time and with the same speed as the wire the heated point of the glass tube to a thin wall encasing the wire, and preventing heating of the wire at the heating and drawing out point to a temperature at which the glass would adhere and melt on to the wire.

2. A method for encasing wires, rods and tubes with thermoplastic material such as glass, consisting in placing in a glass tube the article to be encased, heating any desired point of said glass tube to plastic heat, pulling the wire and the drawn out point of the glass tube at the same speed through the heated part to form a thin glass wall encasing the article, and introducing between the glass tube and the article means for preventing the adhesion of the glass to the article during the drawing operation.

3. A method for encasing wires, rods and tubes with thermoplastic material such as glass consisting in introducing the continuous article to be encased into the interior of a continuously drawn, still plastic glass tube, drawing any point of the glass tube at higher speed than the formation speed of the glass tube, drawing the article with the tube at the same speed at the pliable point, regulating the temperature at the drawing point of the glass tube and the drawing speed to form a thin glass wall encasing the article and preventing the article from being heated at the drawing point to a temperature at which the glass melts on to the wire.

4. A method for encasing wires, rods and tubes with thermoplastic material such as glass consisting in introducing the continuous article to be encased into the interior of a continuously drawn, still plastic glass tube, drawing the pliable point of the glass tube at higher speed than formation speed of the glass tube, drawing the article with the tube at the same speed at the pliable point to form a thin wall encasing the article, and introducing between the glass tube and the article during the drawing operation means for preventing the adhesion of the glass to the article.

5. In a method as specified in claim 1, reheating the article after it is encased with glass, to a temperature at which the article and casing are pliable but the glass does not adhere on and melt to the encased article and winding the encased article.

6. In a method as specified in claim 1, reheating the article after it is encased with glass, to a temperature at which the article and casing are pliable but the glass does not adhere on and melt to the encased article and bending the encased article.

7. A method for encasing wires, rods and tubes with thermoplastic material such as glass, consisting in placing in a glass tube the article to be encased, heating to plastic heat any point of said glass tube, pulling the wire through the heated point, drawing at the same time and with the same speed as the wire the heated point of the glass tube to a thin wall encasing the wire, and regulating the temperature at the heating and drawing out point so that the wire does not adhere on and melt to the glass.

8. A method for encasing wires, rods and tubes with thermoplastic material such as glass, consisting in placing in a glass tube the article to be encased, heating to plastic heat any point of said glass tube, pulling the wire through the heated point, drawing at the same time and with the same speed as the wire the heated point of the glass tube to a thin wall encasing the wire, and regulating the drawing speed or the drawing speed and the temperature at the heating and drawing point so that the wire does not adhere on and melt to the glass.

ALFRED WENDLER.